March 3, 1931.                       C. HANSEN                        1,795,121
              PROCESS FOR THE ABSORPTION OF HYDROGEN
                   SULFIDE AND AMMONIA FROM GASES
                          Filed June 18, 1927
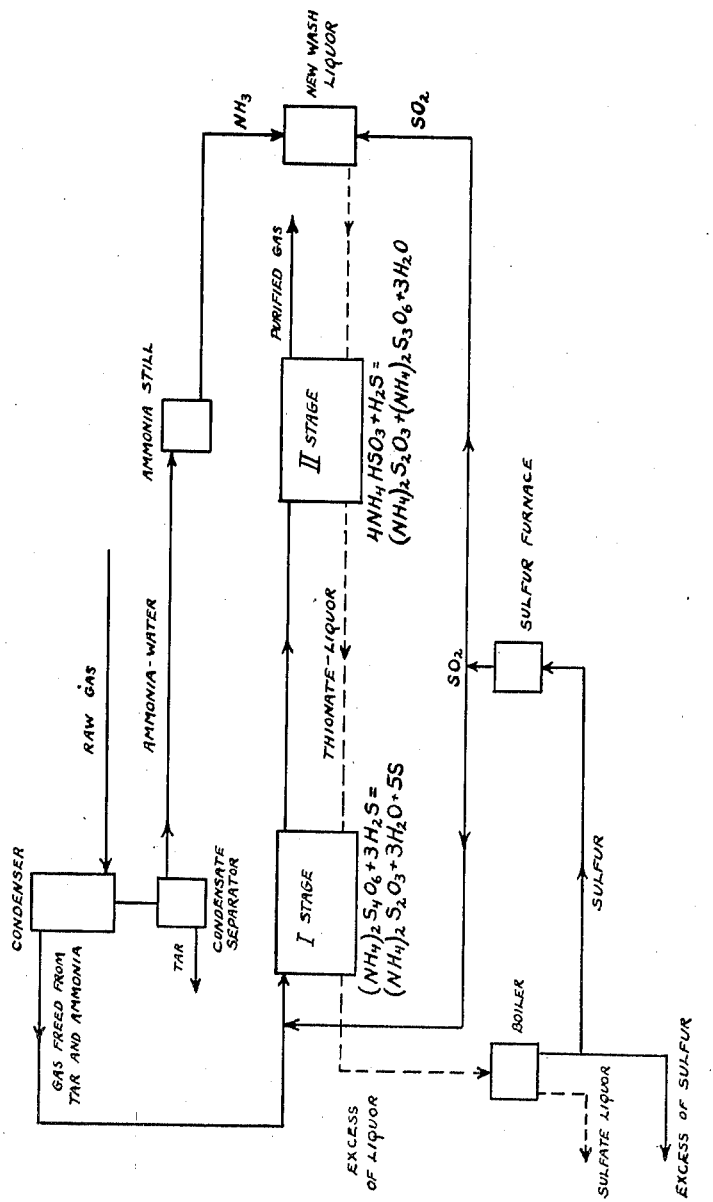
Inventor
CHRISTIAN HANSEN

UNITED STATES PATENT OFFICE

CHRISTIAN HANSEN, OF WIESDORF-ON-THE-RHINE, GERMANY, ASSIGNOR TO I. G. FARBENINDUSTRIE AKTIENGESELLSCHAFT, OF FRANKFORT-ON-THE-MAIN, GERMANY

PROCESS FOR THE ABSORPTION OF HYDROGEN SULFIDE AND AMMONIA FROM GASES

Application filed June 18, 1927, Serial No. 199,862, and in Germany July 21, 1926.

The present invention concerns the removal of ammonia and hydrogen sulfide from coal gases by washing the gases, after separation of a part or the whole of the ammonia, in two stages, in such a manner that hydrogen sulfide is precipitated in the form of sulfur in the first stage to the extent that the remainder of the hydrogen sulfide can be absorbed by means of a neutral ammonium sulfite-bisulfite solution (prepared from the separated ammonia and the precipitated sulfur). The absorption of the hydrogen sulfide in the first stage is effected by washing the gas with the wash-liquor containing thiosulfate and polythionate produced in the second stage,—if necessary, with the addition of sulfurous acid. The process is diagrammatically illustrated by the accompanying flow-sheet and may be carried out wholly or in part under increased pressure.

In accordance with the process described in the application Ser. No. 153,452, filed Dec. 8, 1926, the ammonia and hydrogen sulfide contained in coal gases are removed by means of ammonium sulfite-bisulfite solutions containing certain proportions of ammonia and sulfurous acid. With this molecular ratio of $NH_3 : SO_2$ the solutions have in fact no tension either of ammonia or sulfurous acid, so that no loss of ammonia or sulfurous acid occurs. On treating these solutions with hydrogen sulfide a wash liquor is obtained containing principally ammonium thiosulfate and ammonium polythionate. This solution may be still further enriched in ammonium polythionate content by the addition of sulfurous acid:—

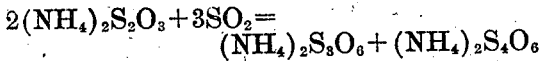

and then boiled in the known manner to give ammonium sulfate and sulfur:—

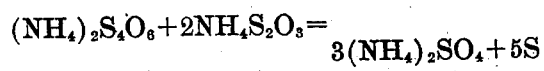

The sulfur is used again for the production of sulfurous acid.

It has been found however, that the carrying out of this process is not practical commercially with the quantities of ammonia and sulfur occurring in some coal gases, since for the absorption of each molecule of hydrogen sulfide more than four molecules of ammonia and a corresponding quantity of sulfurous acid are necessary. The use of such quantities of ammonia and sulfurous acid is not a practicable proposition.

The present invention makes possible the use of the said neutral ammonium sulfite-bisulfite solutions for the complete purification of coal gases from ammonia and hydrogen sulfide.

The solutions containing thiosulfate and polythionate, obtained in washing the gas with sulfite-bisulfite solution, also absorb, without the addition of ammonia, further considerable quantities of hydrogen sulfide due to the decomposition of the latter with ammonium polythionate:—

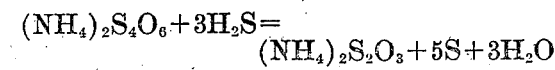

The new process is based on this. The greater part of the ammonia is separated before the washing process and the gas is then washed in two stages. The separation of the ammonia may be effected, for instance, by cooling down the gas as it is usual in coking processes; thereby a great part of the ammonia is separated with the water and the tar. The separation may also be effected by washing the raw gas with water and distilling off the ammonia from the resulting ammonia-water. In the first stage part of the hydrogen sulfide is washed out and obtained as sulfur by means of the thiosulfate and polythionate solution produced in the second stage. The remainder of the hydrogen sulfide is then absorbed by means of a neutral ammonium sulfite-bisulfite solution produced from the ammonia previously separated and sulfurous acid. The quantity of hydrogen sulfide to be removed in the first stage must be such that the separated ammonia suffices for removing the remainder of the hydrogen sulfide.

In the first stage of the washing a quantity of sulfurous acid corresponding to the hydrogen sulfide may be added to the washing liquors or to the gas before it is introduced into the washing apparatus, so that the washing process proceeds mainly in accordance with the equation:—

$$2H_2S + SO_2 = 2H_2O + 3S$$

This reaction is considerably facilitated by the presence of the ammonium thiosulfate contained in the solution. The sulfurous acid not converted in accordance with the above equation combines with thiosulfate to form polythionate:

$$2(NH_4)_2S_2O_3 + 3SO_2 + S = 2(NH_4)_2S_4O_6$$

so that this solution may be directly converted by boiling into ammonium sulfate and sulfur. The sulfur precipitated on boiling and in the first stage serves for the production of the required sulfurous acid. The production of the sulfite-bisulfite solution is advantageously carried out in a separate apparatus but it can, however, be effected in the second stage itself. The process may be carried out wholly or in part under superatmospheric pressure.

I claim:

1. In the process of separating ammonia and hydrogen sulfide from gases containing the same by washing the gases with liquors, the steps which comprise separating from the gases the greatest part of their ammonia content by causing precipitation of the ammonia by means of water, washing the residual gases in two stages whereby in the first stage with the aid of a solution containing ammonium thiosulfate, sulfur dioxide and ammonium polythionate such a part of the hydrogen sulfide is precipitated in the form of sulfur that for the washing of the residual hydrogen sulfide in the second stage the neutral ammonium sulfite-bisulfite solution suffices which is produced from the separated ammonia and sulfur.

2. Process according to claim 1 which comprises adding to the first washing stage such a part of sulfurous acid as is chemically equivalent to the amount of hydrogen sulfide present in the gases.

3. Process according to claim 1 consisting in effecting the separation of ammonia and hydrogen sulfide under superatmospheric pressure.

4. Process according to claim 1 which comprises adding to the first washing stage such a part of sulfurous acid as is chemically equivalent to the amount of hydrogen sulfide present in the gases, and carrying out the process under superatmospheric pressure.

In testimony whereof I have hereunto set my hand.

CHRISTIAN HANSEN.